United States Patent
Xiong

(10) Patent No.: US 12,026,292 B2
(45) Date of Patent: Jul. 2, 2024

(54) REMOTE CONTROL-BASED METHOD FOR PROTECTING INFORMATION ON DEVICE SCREEN

(71) Applicant: SAND STUDIO PTE. LTD., Singapore (SG)

(72) Inventor: Jun Xiong, Singapore (SG)

(73) Assignee: SAND STUDIO PTE. LTD., Singapore (SG)

( * ) Notice: Subject to any disclaimer, the term of this patent is extended or adjusted under 35 U.S.C. 154(b) by 336 days.

(21) Appl. No.: 17/577,052

(22) Filed: Jan. 17, 2022

(65) Prior Publication Data
US 2023/0195947 A1 Jun. 22, 2023

(30) Foreign Application Priority Data
Dec. 21, 2021 (CN) .......................... 202111573333.X

(51) Int. Cl.
*G06F 21/00* (2013.01)
*G06F 3/14* (2006.01)
*G06F 21/84* (2013.01)

(52) U.S. Cl.
CPC ............ *G06F 21/84* (2013.01); *G06F 3/1454* (2013.01)

(58) Field of Classification Search
None
See application file for complete search history.

(56) References Cited

U.S. PATENT DOCUMENTS

| | | | | |
|---|---|---|---|---|
| 9,406,157 | B2* | 8/2016 | Liu | ........................ G06F 21/31 |
| 10,306,184 | B1* | 5/2019 | Petrov | ................. H04L 12/1813 |
| 11,151,309 | B1* | 10/2021 | Gao | ........................ G06F 18/22 |
| 11,317,053 | B2* | 4/2022 | Zhu | .................. H04N 21/44227 |

(Continued)

FOREIGN PATENT DOCUMENTS

CN 113642053 A 11/2021

OTHER PUBLICATIONS

Bundalo, Zlatko et al. Increasing desktop application and user data protection using smartphone. 2016 24th Telecommunications Forum (TELFOR). https://ieeexplore.ieee.org/stamp/stamp.jsp?tp=&arnumber=7818870 (Year: 2016).*

(Continued)

*Primary Examiner* — Jeremiah L Avery
(74) *Attorney, Agent, or Firm* — Bayramoglu Law Offices LLC

(57) ABSTRACT

A remote control-based method for protecting information on a device screen is provided. A controlling terminal controls a controlled terminal through a remote control system, and the remote control-based method specifically includes the following steps: S1: superimposing a floating layer on a content page of a screen of the controlled terminal; S2: adjusting transparency of the floating layer to allow the content page on the screen of the controlled terminal to be invisible; S3: taking a screenshot of the controlled terminal; and S4: adjusting brightness of the screenshot to restore the content page to be normally visible and displayed at the controlling terminal. The remote control-based method can prevent screen information on a remote device from being disclosed, provide a more secure and private environment for a remote control process, and protect the security of information.

8 Claims, 3 Drawing Sheets

(56) References Cited

U.S. PATENT DOCUMENTS

| | | | | |
|---|---|---|---|---|
| 11,647,392 | B1* | 5/2023 | Lawrence | G06F 3/0416 345/173 |
| 11,678,011 | B1* | 6/2023 | Fu | H04N 21/8549 348/143 |
| 11,908,571 | B1* | 2/2024 | Trojman | G16H 40/20 |
| 2014/0123299 | A1* | 5/2014 | Jung | G06F 21/62 726/26 |
| 2015/0278534 | A1* | 10/2015 | Thiyagarajan | G06F 21/84 726/28 |
| 2015/0302621 | A1* | 10/2015 | Liu | G06T 11/60 345/647 |
| 2016/0082839 | A1* | 3/2016 | Ricci | G06F 3/013 701/36 |
| 2017/0040002 | A1 | 2/2017 | Basson et al. | |
| 2017/0064208 | A1* | 3/2017 | Salimpour | G06F 3/0484 |
| 2017/0068829 | A1* | 3/2017 | Shaw | G06F 21/50 |
| 2018/0336373 | A1* | 11/2018 | Deenadayal | G06T 5/70 |
| 2019/0253611 | A1* | 8/2019 | Wang | G06F 3/04845 |
| 2019/0373210 | A1* | 12/2019 | Nguyen | G06V 20/59 |
| 2020/0193559 | A1* | 6/2020 | Sano | G06F 3/14 |
| 2020/0349296 | A1* | 11/2020 | Young | G09C 5/00 |
| 2021/0026508 | A1* | 1/2021 | Jacobs | G06T 1/20 |
| 2021/0203627 | A1* | 7/2021 | Luo | G06T 11/60 |
| 2021/0349677 | A1* | 11/2021 | Baldev | G09C 5/00 |
| 2022/0035958 | A1* | 2/2022 | Homma | G06F 21/84 |
| 2022/0116546 | A1* | 4/2022 | Gummadi | H04M 1/724 |
| 2022/0245265 | A1* | 8/2022 | Silverstein | G06F 21/84 |
| 2022/0253268 | A1* | 8/2022 | Deole | G09G 5/12 |
| 2022/0300598 | A1* | 9/2022 | Ford | G06F 21/31 |
| 2022/0309183 | A1* | 9/2022 | Jose | G06F 21/6245 |
| 2022/0414241 | A1* | 12/2022 | Chittampally | G09G 5/00 |

OTHER PUBLICATIONS

Bhanpurawala, Alifiya et al. Screen sharing application for mobile phones. 2015 International Conference on Technologies for Sustainable Development (ICTSD). https://ieeexplore.ieee.org/stamp/stamp.jsp?tp=&arnumber=7095867 (Year: 2015).*

Bryant, Ian. Factors in sharing sensitive security information. 2014 Science and Information Conference. https://ieeexplore.ieee.org/stamp/stamp.jsp?tp=&arnumber=6918243 (Year: 2014).*

Guerar, Meriem et al. Using Screen Brightness to Improve Security in Mobile Social Network Access. EEE Transactions on Dependable and Secure Computing, vol. 15, Issue: 4. https://ieeexplore.ieee.org/stamp/stamp.jsp?tp=&arnumber=7547911 (Year: 2018).*

Yue, Huanjing et al. Recaptured Screen Image Demoiréing. IEEE Transactions on Circuits and Systems for Video Technology, vol. 31, Issue: 1. https://ieeexplore.ieee.org/stamp/stamp.jsp?tp=&arnumber=8972378 (Year: 2021).*

* cited by examiner

REMOTE CONTROL-BASED METHOD FOR PROTECTING INFORMATION ON DEVICE SCREEN

CROSS REFERENCE TO THE RELATED APPLICATIONS

This application is based upon and claims priority to Chinese Patent Application No. 202111573333.X, filed on Dec. 21, 2021, the entire contents of which are incorporated herein by reference.

TECHNICAL FIELD

The present invention relates to the field of remote control technologies, and more particularly to a remote control-based method for protecting information on a device screen.

BACKGROUND

The popularization and development of mobile devices have provided enterprises with unprecedented productivity, and more and more mobile devices have been applied to the production and operation processes in enterprises. The use of mobile devices allows businesses of enterprises to break the geographical boundaries and come into all corners of the city. However, it has also become more difficult to implement effective management and support for these remote mobile devices. When these remote mobile devices fail, for example, a system or software service crash, the business of an enterprise may be paralyzed, while on-site maintenance not only requires a large amount of time but on-site maintenance also increases the cost.

Remote control technology can learn about on-site situations quickly, and immediately carry out remote processing, thereby achieving timely troubleshooting and effectively reducing travel costs. Normally, the screens of a controlling terminal and a controlled terminal are synchronized. When maintenance personnel performs remote maintenance at the controlling terminal, especially for remote mobile devices placed in public places, some operations are undesirable to be seen by others due to privacy or security reasons, for example, inputting an administrator password, or confidential background settings. Therefore, remote control requires a more secure and private protection environment to protect the security of enterprise information.

SUMMARY

To resolve the foregoing problem, the present invention provides a remote control-based method for protecting information on a device screen.

The present invention adopts the following technical solutions.

A remote control-based method for protecting information on a device screen is provided, where a controlling terminal controls a controlled terminal through a remote control system, and the remote control-based method specifically includes the following steps:

S1: superimposing a floating layer on a content page of a screen of the controlled terminal;

S2: adjusting transparency of the floating layer to allow the content page on the screen of the controlled terminal to be invisible;

S3: taking a screenshot of the controlled terminal; and

S4: adjusting brightness of the screenshot to restore the content page to be normally visible and displayed at the controlling terminal.

Further, in step S2, when the transparency of the floating layer is adjusted, backlight of the screen of the controlled terminal is turned off.

Further, the floating layer is a transparent superimposed layer.

Further, the floating layer in step S2 is a full-screen floating layer or a regional floating layer.

Further, an operating system of the controlled terminal is an Android system.

Further, an operating system of the controlling terminal is any one of the Android system, an iphone operation system (IOS), a Mac system, or a Windows system.

Further, before step S1, the remote control-based method further includes: starting the remote control system and entering a safe mode.

Further, after step S4, the remote control-based method further includes: exiting from the safe mode and closing the remote control system.

Further, step S4 includes: if the operating system of the controlled terminal has accessibility permission, checking, through the accessibility permission, whether the screenshot is covered by the floating layer; if the screenshot is covered by the floating layer, performing brightness enhancement processing according to red-green-blue (RGB) three primary colors, and then sending the screenshot to the controlling terminal, and if the screenshot is not covered by the floating layer, directly sending the screenshot to the controlling terminal.

Further, step S4 includes: if the operating system of the controlled terminal does not have accessibility permission, but has root or root-free permission, detecting a black coverage proportion of the screenshot; if the black coverage proportion is greater than or equal to 90%, performing brightness enhancement processing through gamma correction based on red-green-blue (RGB) three primary colors, and then sending the screenshot to the controlling terminal, and if the black coverage proportion is less than 90%, directly sending the screenshot to the controlling terminal.

After the foregoing technical solution is used, compared with the background art, the present invention has the following advantages:

The present invention provides a remote control-based method for protecting information on a device screen. During remote control of an Android device, a display screen on the remote device is hidden by setting a floating layer, so that information on the screen is unreadable, but maintenance personnel at a controlling terminal can still read the screen of the remote device normally, thereby avoiding the leakage of screen information on the remote device, providing a safer and more private environment for the remote control, and protecting the security of information.

DETAILED DESCRIPTION OF THE EMBODIMENTS

In order to make the object, the technical solution and the advantages of the present invention clearer, the present invention is further described in detail with reference to the following drawings and embodiments. It should be understood that the specific examples described herein are merely intended to explain the present invention, rather than to limit the present invention.

Example

Figure 1:
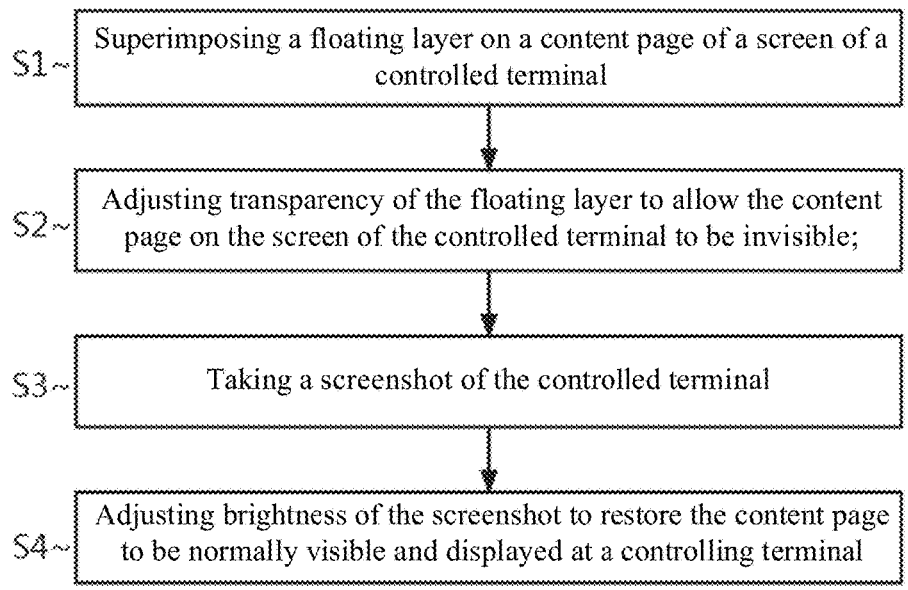
FIG. 1 is a flowchart of a method according to the present invention.

FIG. 1 shows a remote control-based method for protecting information on a device screen, where a controlling terminal controls a controlled terminal through a remote control system, and an operating system of the controlled terminal is an Android system. The remote control-based method specifically includes the following steps.

First, start the remote control system and enter a safe mode.

S1: superimpose a floating layer on a content page of a screen of the controlled terminal, where the floating layer is a full-screen floating layer or a regional floating layer; and the floating layer is a transparent superimposed layer. Specifically, a full-screen black transparent floating layer is used in this embodiment.

S2: adjust transparency of the floating layer to allow the content page on the screen of the controlled terminal to be invisible. For example, adjust the transparency of the floating layer to 80-99%, and turn off backlight of the screen of the controlled terminal, so that the content page on the screen of the controlled terminal is invisible. In this step, after the content page displayed on the screen of the controlled terminal is covered by the black transparent floating layer with very low transparency, the screen is extremely approximate to black. In addition, because the backlight has been turned off, the whole screen cannot be read normally, thereby protecting the screen information.

S3: take a screenshot of the controlled terminal. In this step, because the transparency of the floating layer is not 100% (completely opaque), the screenshot is nearly black, but it still retains information of the original content page.

S4: the remote control system adjusts brightness of the screenshot, increases the brightness of the screenshot to restore the screen to be normally visible, and displays the adjusted screenshot at the controlling terminal, so that maintenance personnel at the controlling terminal can see the information of the normal content page.

If the remote control system is not granted permission for the floating layer, the remote control system cannot set or edit the floating layer. If the remote control system is granted permission for the floating layer, step S4 includes the following two cases:

(1) If the operating system of the controlled terminal has accessibility permission, "accessibility permission-floating layer" is enabled. The remote control system checks, with the accessibility permission, whether the screenshot is covered by the floating layer. If the screenshot is covered by the floating layer, brightness enhancement processing is performed based on red-green-blue (RGB) three primary colors by multiplying all values by 10 with Android's built-in API, and then the screenshot is sent to the controlling terminal. If the screenshot is not covered by the floating layer, the screenshot is directly sent to the controlling terminal.

(2) If the operating system of the controlled terminal does not have accessibility permission, but has root or root-free permission, "general floating layer" is enabled. The remote control system first detects a black coverage proportion of the screenshot. If the black coverage proportion is greater than or equal to 90%, brightness enhancement processing is performed through gamma correction based on red-green-blue (RGB) three primary colors, and then the screenshot is sent to the controlling terminal. If the black coverage proportion is less than 90%, the screenshot is directly sent to the controlling terminal. This is because in this case, only the middle region of the screenshot is covered by the black floating layer, while bars in the upper and lower part are not covered. If the remote control system adjusts the brightness of the entire screenshot through non-gamma correction, the uncovered bars in the upper and lower part will be overexposed, and the brightness will be falsely increased because of misjudgment as using a screen with a black background.

Specifically, a device with root permission can directly obtain the permission to take screenshots and simulate taps and swipes. Root-free permission means that a common device without root permission can obtain, by running adb shell, the permission to take screenshots and simulate taps and swipes.

After the operations are complete, exit from the safe mode and close the remote control system. In this embodiment, an operating system of the controlling terminal is an Android system, an IOS, a Mac system, or a Windows system.

Figure 2:
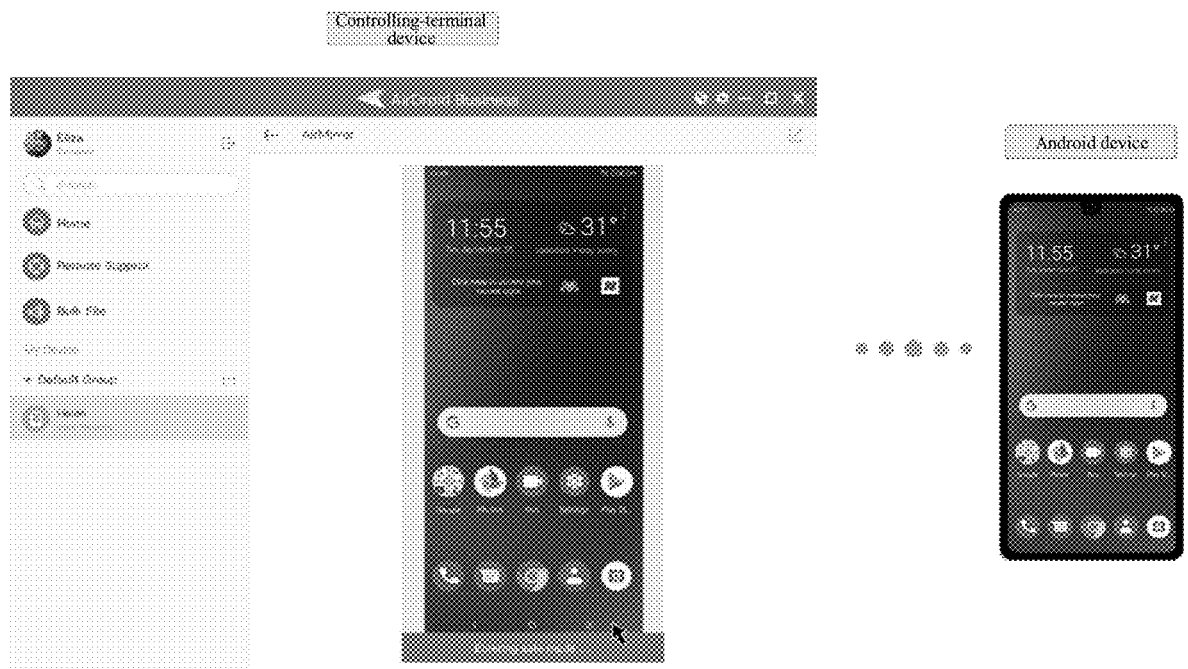
FIG. 2 is an example diagram of screen display before entering a safe mode according to an embodiment.

Specifically, the screen flow of the method described in this embodiment is as follows:

1. Enable remote control at the controlling terminal. As shown in FIG. 2, normal screen display can be seen at both the controlling terminal and the controlled terminal.

Figure 3:
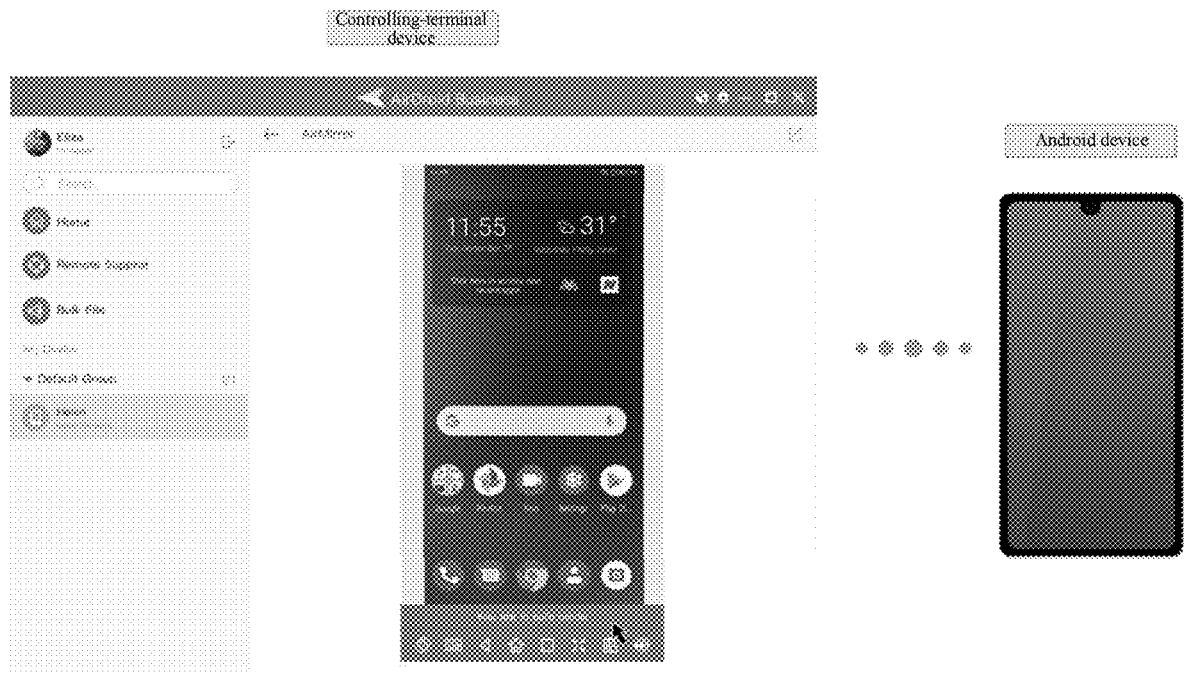
FIG. 3 is an example diagram of screen display after entering a safe mode according to an embodiment.

2. After the remote control system enters the safe mode, as shown in FIG. 3, a screen of the remote Android device becomes black and is hidden, but the screen of the remote Android device is still visible to the controlling terminal.

Figure 4:
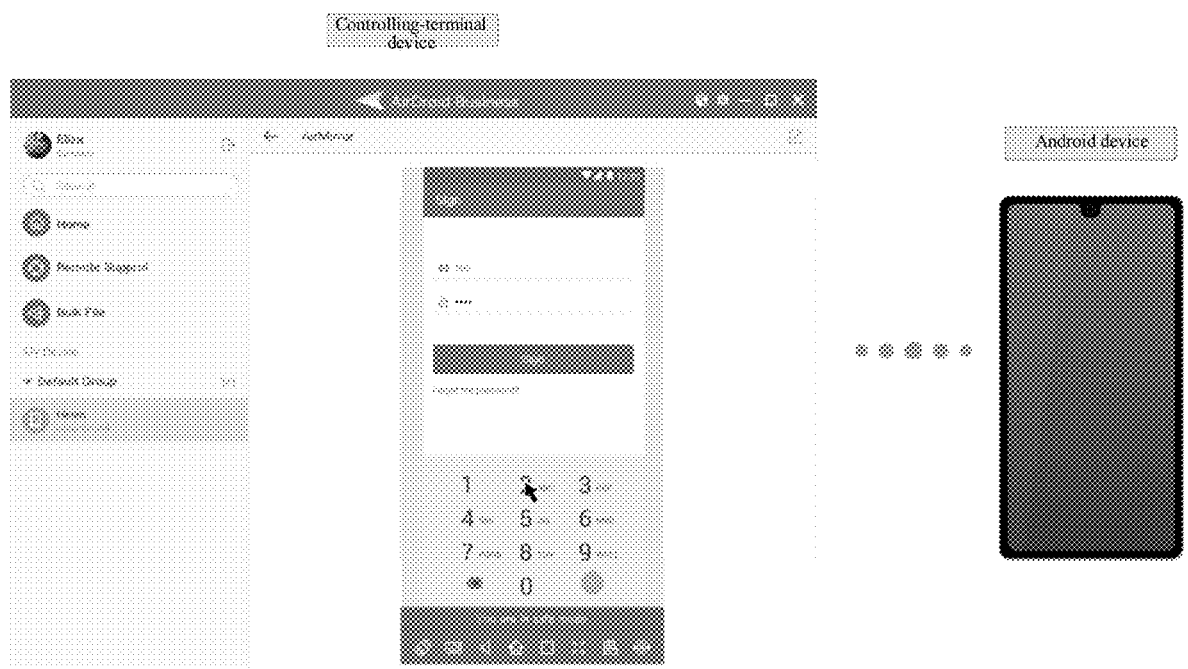
FIG. 4 is an example diagram of screen display in a remote maintenance process according to an embodiment.

3. In this case, as shown in FIG. 4, remote maintenance can be carried out at the controlling terminal, such as inputting an account and password or accessing software of the enterprise.

Figure 5:
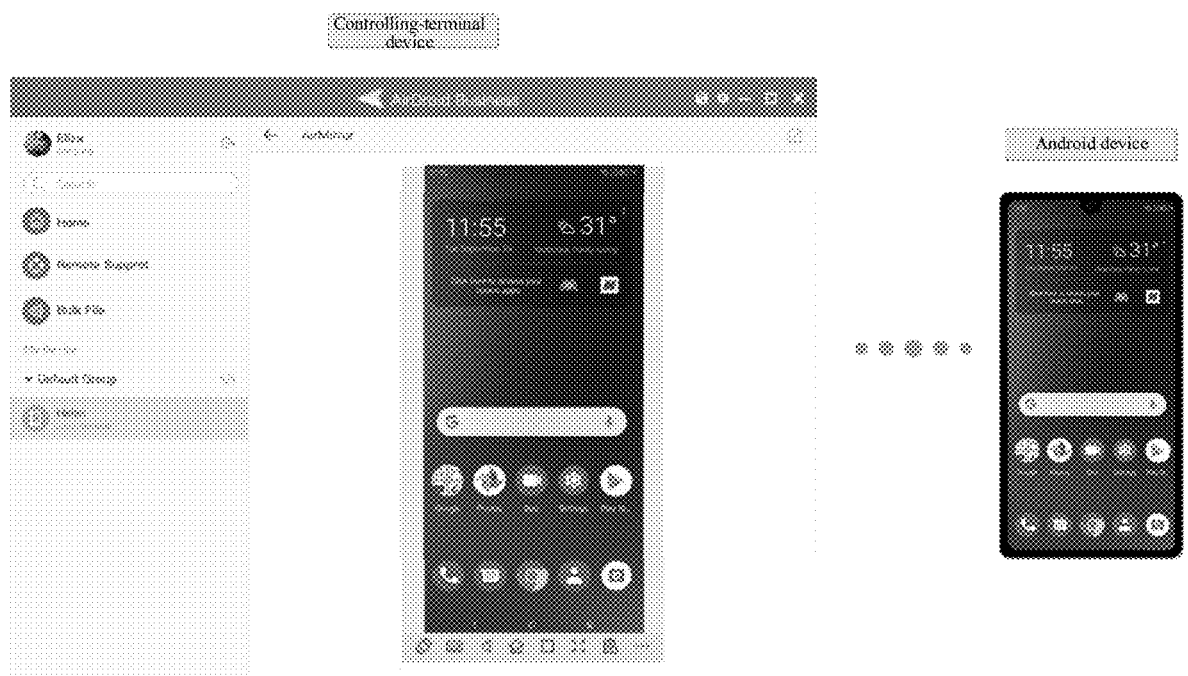
FIG. 5 is an example diagram of screen display after exiting from a safe mode according to an embodiment.

4. After the remote maintenance is completed, exit from the safe mode, as shown in FIG. 5. The screen display of the remote Android device recovers to normal.

The method in this embodiment greatly protects the screen privacy when a user remotely controls an Android device, for example, inputting a password, viewing confidential information, and performing a confidential operation, thereby remotely protecting information of the controlling terminal from being disclosed and viewed.

The above described are merely specific implementations of the present invention, and the protection scope of the present invention is not limited thereto. Any modification or replacement easily conceived by those skilled in the art within the technical scope of the present invention should fall within the protection scope of the present invention. Therefore, the protection scope of the present invention should be subject to the protection scope of the claims.

What is claimed is:

1. A remote control-based method for protecting information on a device screen, wherein a controlling terminal controls a controlled terminal through a remote control system, and the remote control-based method specifically comprises the following steps:

S1: superimposing a floating layer on a content page of a screen of the controlled terminal;

S2: adjusting transparency of the floating layer to allow the content page on the screen of the controlled terminal to be invisible;

S3: taking a screenshot of the controlled terminal; and

S4: adjusting brightness of the screenshot to restore the content page to be visible and displayed at the controlling terminal.

2. The remote control-based method according to claim 1, wherein in step S2, when the transparency of the floating layer is adjusted, backlight of the screen of the controlled terminal is turned off.

3. The remote control-based method according to claim 2, wherein the floating layer is a transparent superimposed layer.

4. The remote control-based method according to claim 3, wherein the floating layer in step S2 is a full-screen floating layer or a regional floating layer.

5. The remote control-based method according to claim 1, wherein before step S1, the remote control-based method further comprises: starting the remote control system and entering a safe mode.

6. The remote control-based method according to claim 5, wherein after step S4, the remote control-based method further comprises: exiting from the safe mode and closing the remote control system.

7. The remote control-based method according to claim 4, wherein step S4 comprises: when the operating system of the controlled terminal has accessibility permission, checking, through the accessibility permission, whether the screenshot is covered by the floating layer, wherein when the screenshot is covered by the floating layer, performing brightness enhancement processing based on red-green-blue (RGB) three primary colors, and then sending the screenshot to the controlling terminal, and when the screenshot is not covered by the floating layer, directly sending the screenshot to the controlling terminal.

8. The remote control-based method according to claim 4, wherein step S4 comprises: when the operating system of the controlled terminal does not have accessibility permission, but has root or root-free permission, detecting a black coverage proportion of the screenshot, wherein when the black coverage proportion is greater than or equal to 90%, performing brightness enhancement processing through gamma correction based on red-green-blue (RGB) three primary colors, and then sending the screenshot to the controlling terminal, and when the black coverage proportion is less than 90%, directly sending the screenshot to the controlling terminal.

\* \* \* \* \*